(No Model.)
C. P. ALLEN.
WATER FILTER.
No. 538,720. Patented May 7, 1895.
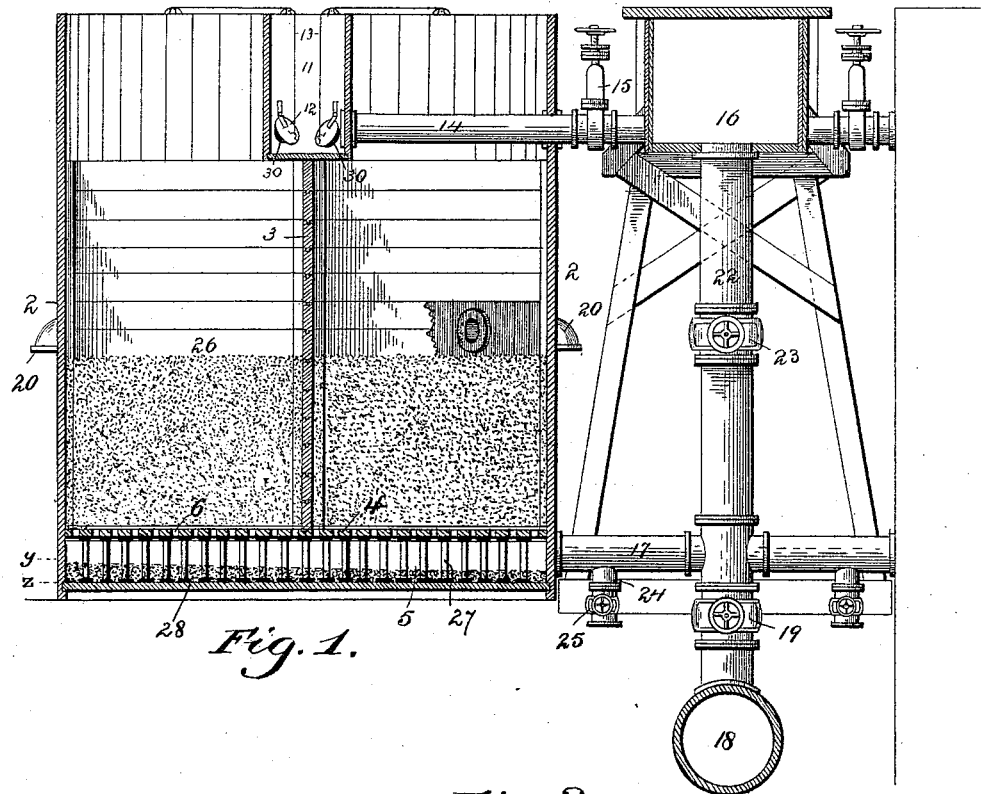
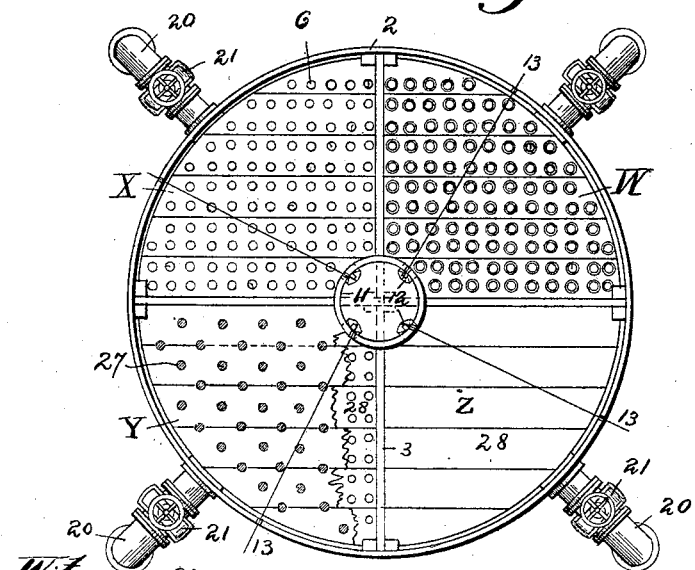
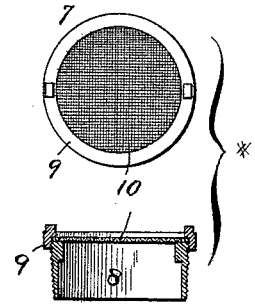
Inventor:
Charles P. Allen
By Charles & William D. King
Attorneys
Witnesses:
J. B. McGinn
Chas. B. Parker

UNITED STATES PATENT OFFICE.

CHARLES P. ALLEN, OF DENVER, COLORADO.

WATER-FILTER.

SPECIFICATION forming part of Letters Patent No. 538,720, dated May 7, 1895.

Application filed June 1, 1893. Serial No. 476,263. (No model.)

*To all whom it may concern:*

Be it known that I, CHARLES P. ALLEN, a citizen of the United States, residing at Denver, in the county of Arapahoe and State of Colorado, have invented certain new and useful Improvements in Water-Filters; and I do hereby declare the following to be a full, clear, and exact description of the invention, such as will enable others skilled in the art to which it appertains to make and use the same.

My invention relates to filters of the kind which are employed to furnish filtered water in large quantities to mills, towns, and cities, and it has for its object to so improve filters of this class that the bed of filtering material can be more effectually, thoroughly and economically cleaned than has heretofore been possible, and to permit this cleaning of the filter bed to take place without stopping the operation of the filter, so that a constant supply of filtered water can be furnished even while the cleansing operation is taking place.

To this end my invention consists in a filter which is so constructed that the sand or other substance which constitutes the filtering bed can be washed in sections, that is, one section or portion at a time, while the other section or sections of the filter are operating to take the unfiltered water from its source and deliver it filtered to the supply pipe which supplies the mill or the city.

The invention further consists in improvements whereby a section of the filter bed can be washed, first by a current of water direct from the source, that is, with unfiltered water, and can then be further washed by water which has passed through the filter, such washings taking place without in anywise interfering with the ordinary operations of the other sections of the filter.

The invention further consists in improvements whereby the entire body of water which is delivered to the filter can be forced in a reverse direction through one of the sections thereof, thus insuring that the entire body of the filtering bed shall be thoroughly broken up, and the deposit of sediment washed out from all parts thereof, instead of being washed out only partially as has been found to be the case in many filters constructed as they are ordinarily.

I have in the accompanying drawings illustrated the preferred form of my invention, although it will be understood that it can, in details of construction, be varied or modified without departing from the essential features of the invention.

Referring to such drawings, Figure 1 is a vertical section through a filter embodying my improvements. Fig. 2 is a top plan view, parts of the apparatus being broken away and other parts shown in section. Fig. 3 represents in top plan and in vertical section one of the strainers used in the bottom of the filter.

Referring to the drawings, 2 indicates the filter case in which is placed the bed 26 of sand or other suitable filtering material. This filter case may be of any suitable shape and size, that form which I prefer being cylindrical. The interior of the case is divided into a number of compartments or chambers by the partitions 3,—in that form of my invention which I have shown there being four separated compartments, in each one of which there is arranged a bed of filtering material 26. The partitions 3 extend for a considerable distance above the top of the filtering bed, and if desired they may extend to the top or cover of the filter case; this latter construction being necessitated when the head of water is considerable or when the filter is operated under pressure so that the entire case is filled. When the filter operates only by gravity with a head of water lower than the top of the filter case the partitions need not extend quite to the top of the filter case 2, but they always should extend above the head of the water to be filtered.

Some distance above the bottom 28 of the filter case there is arranged a perforated false bottom 4 which is supported by the pillars or posts 27, and below which is a chamber 5 which communicates, through the perforations 6 in the false bottom, with the several compartments of the filter case 2. The compartment or chamber 5 is thus common to the several compartments of the filter case in which are situated the separated bodies of filtering material.

I prefer to place in each one of the perforations, 6, in the false bottom, 4, a strainer, 7, such as is illustrated in Fig. 3. The strainer is preferably formed of a short metallic sleeve 8, preferably of brass and screw-threaded externally so as to fit a correspondingly formed screw thread in the aperture 6. A clamping ring 9 is screwed onto the end of the tube or sleeve 8, and between shoulders upon the said ring and sleeve is clamped the strainer plate, 10. These strainers prevent the escape or wasting away of the material which constitutes the filter bed.

In Fig. 2 the several compartments of the filter are designated respectively W, X, Y, and Z. The compartment W is represented as being complete and ready to receive the filtering material H. The compartment X is like compartment W, except that the strainers are not in place. The compartment Y is represented in section, on the line $y$ of Fig. 1, and the compartment Z represents the floor or bottom 28 of the filter, below the line $z$ of Fig. 1.

The water to be filtered is delivered from a trunk or other conduit, 16, through a pipe, 14, into a chamber or receptacle, 11, situated in the upper part of, or above the filter case 2. This receptacle 11 communicates with the several compartments into which the filter case is divided through the openings 30, which openings are covered by the valves 12. The valves have connected with them cords 13 or other means whereby they may be opened and closed from without the filter case, so that the communication between the receptacle 11 and any particular compartment of the filter case can be cut off.

It will be seen that by properly manipulating the valves 12 the whole or any part of the entire filter can be operated at the pleasure of the attendant.

The supply pipe 14 is provided with a valve 15 by which the supply of water is controlled. 17 represents the discharge pipe from the filter. It opens into the chamber 5 and communicates with the main or pipe 18 which supplies the mill or town with filtered water. 19 indicates a valve by means of which the amount of water passing from the pipe 17 to the main 18 can be controlled or can be entirely cut off.

20 indicates a waste pipe communicating with one of the compartments of the filter case above the upper surface of the filter bed but below the opening into the compartment through which the water is delivered from the supply pipe or conduit 14. There is one of these waste pipes for each compartment, and each pipe is provided with a valve 21.

22 indicates a pipe connecting the supply pipe or conduit 16 with the discharge pipe 17, and 23 is a valve therein. By means of this connection the unfiltered water can be passed from the conduit 16 through the pipes 22 and 17 into the chamber 5 situated below the several filter beds and thus the direction which the unfiltered water passes through the filter bed can be reversed.

24 indicates a waste pipe communicating with the discharge pipe 17, and 25 indicates the valve device controlling the flow through such waste pipe.

Having thus described the several parts of my improved filter its operation can now be readily understood.

When the filter is being used in the ordinary manner the valves in the waste pipes 20 and 24 are closed, as is also the valve 23 in the connecting pipe 22. The valve 15 in the supply pipe 14, and the valve 19 between the discharge pipe 17 and the main 18 are open. The valves 12 covering the openings 30 to those sections of the filter bed which it is desired to use are uncovered so that the supply of water delivered through the pipe 14 into the chamber 11 passes freely therefrom into the several compartments of the filter. The water which passes through the several compartments of the filter collects in the compartment 5 and there mingling passes out through the discharge pipe 17.

When it is desired to cleanse the filter bed it is done by washing the bed in one of the sections or compartments of the filter case at a time. To do this the valve in the waste pipe 20 for the section which it is desired to cleanse is opened, and the valve 12 which covers the supply opening 30 thereto is closed, thus shutting off the compartment from the rest of the filter except through the chamber 5 which is common to the several compartments or sections of the filter case. The valve 19 is then partially closed so as to throttle the discharge pipe to the desired extent, the result being that a certain proportion of the filtered water backs up through the bed in that compartment which is to be cleansed. It will be observed that when a particular section of the filter bed is being cleansed as thus described that the water which effects the cleansing is filtered and therefore pure. It will also be observed that the filtering operation of the other sections of the filter is not interfered with, and that while the cleansing is going on there is still being supplied to the main 18 a considerable portion of water, so that while the cleansing operation is going on it is not necessary to entirely suspend the filtering operation. This is, as will be understood, a very important feature, especially where the full capacity of the filter is being constantly used.

It is sometimes desirable to begin the washing or cleansing operation with the whole force of the unfiltered water and to finish the washing with water which has been passed through the filter. To do this it is necessary first to close the valves 15 and 19, and to open the valve 23 in the connecting pipe 22, and the valve 21 in the waste pipe of the particular section which is to be cleansed. It will be seen that when the valves are thus set that the entire body of unfiltered water passes into the compartment or chamber 5 of the filter and then through the bed of the particular section which is to be cleansed, and passes out through the waste pipe 20. This passing of the entire body of water delivered to the filter in a reverse direction through one section thereof results in a very thorough breaking up of the bed so that any crust which may have formed therein is destroyed and the sediment which has been collected is carried out from the body of filtering material. After the reverse current of unfiltered water has flowed sufficiently long, the valves are set to complete the cleansing operation with filtered water which has passed through the other sections of the filter as has been heretofore described.

After the filter has been washed with unfiltered water the first water which passes in the opposite direction through the filter is more or less discolored and riled and to allow that to escape the valve 19 is closed and the valve 25 in the waste pipe 24 is opened. These conditions are maintained until the water which escapes from the pipe 24 is clear, when the valve 25 is closed and the valve 19 is again opened.

The several sections of the filter bed are washed in succession as may be found necessary.

It will be observed that the filter which I have described is exceedingly simple in construction and yet its capacity is great, for the reason that the entire cessation of the filtering operation is not necessary when the filter bed is being cleansed. By arranging the parts as I have described a more rapid and thorough cleansing is secured than has heretofore been attainable.

Having thus described my invention, what I claim, and desire to secure by Letters Patent, is—

1. The combination of the filter case divided by partitions into a plurality of compartments, and provided with a perforated bottom on one side of which there is formed a chamber or compartment for the filtered water, common to the several filter compartments, the filter beds in the several compartments, the top of the beds being below the upper edges of the partitions, separate water supply conduits,— one for each filter compartment,—independent valves, one for each of the said conduits, the separate waste pipes,—one for each filter compartment,—opening thereinto above the filter beds, the independent valves, one for each waste pipe, and the valved discharge pipe for the filtered water leading from the compartment or chamber below the said perforated bottom, substantially as set forth.

2. A filter having separate compartments in each of which is a filter bed, a chamber communicating with the several filter compartments into which the filtered water passes therefrom, the separate valved supply and waste water conduits for the several filter compartments, a valved discharge conduit leading from the chamber into which the filtered water is passed from the filter compartments, and the waste pipe 24 provided with a valve 25 connecting with the said discharge pipe between its valve and the compartment into which the filtered water is delivered, substantially as set forth.

3. In a filter the following parts, a case 2 divided by the vertically arranged partitions 3 into a plurality of compartments, and provided with a perforated false bottom below the said partitions 3, thereby forming a chamber which communicates with the several compartments of the filter and into which the filtered water passes therefrom, the filter beds in the different compartments of the filter case, the upper surface of the filtered beds being below the top of the said partitions, the chamber or water receptacle 11 in the upper part of the filter case, the supply pipe 14 leading thereto, the separate valved-openings 30 forming communications between the water receptacle 11 and the separate compartments of the filter, means for regulating the valves, the valved waste pipes 20 leading from the separate compartments of the filter case above the filter beds, the discharge pipe 17 leading from the receptacle to which the filtered water passes, and provided with a suitable regulating and throttling valve 19, the connecting pipe 22 between the said discharge pipe and the supply pipe through which the supply of unfiltered water is received provided with a valve, and the waste pipe 24 provided with a valve and connected with the discharge pipe 17, substantially as set forth.

In testimony whereof I affix my signature in presence of two witnesses.

CHARLES P. ALLEN.

Witnesses:
   D. W. STEVENS,
   E. B. DURFEE.